Figure 1:
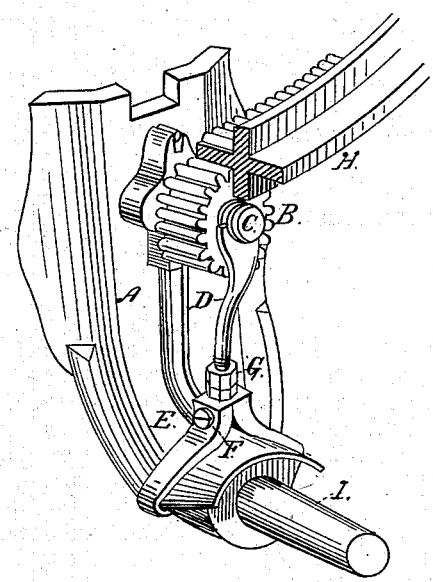

J. A. FIELD.
TRAVERSE PINIONS FOR HORSE-POWERS.

No. 186,238. Patented Jan. 16, 1877.

WITNESSES:

INVENTOR:

John A. Field.

UNITED STATES PATENT OFFICE.

JOHN A. FIELD, OF RACINE, WISCONSIN, ASSIGNOR TO J. I. CASE & CO., OF SAME PLACE.

IMPROVEMENT IN TRAVERSE-PINIONS FOR HORSE-POWERS.

Specification forming part of Letters Patent No. 186,238, dated January 16, 1877; application filed June 24, 1876.

*To all whom it may concern:*

Be it known that I, JOHN A. FIELD, of Racine, in the county of Racine, in the State Wisconsin, have invented certain Improvements in Support to Outer End of Traverse-Pinions for Two-Wheel Horse-Powers, of which the following is a specification:

My invention has for its object the supporting of the outer end of a traverse-pinion for use on a two-wheel horse-power. The journal on which the pinion runs is liable to get loose and sag down, so that the pinion works out of gear, but this arrangement holds up the outer end of the shaft and prevents it from sagging.

Figure 1 is a perspective view of my invention.

A is the bracket bolted onto the side of the machine, which supports the pinion B; C, the shaft on which the pinion runs; D, a support, the upper end forming a bearing for the outer end of shaft C; E, a clasp, clasping the bottom part of the bracket A, made in two pieces, and held together by a screw, F, which passes through the top of same and by the side of the lower end of the support D, which passes down behind the screw F; G, a couple of nuts screwed onto the bottom of support D, and resting on the top of clasp E, with which the support may be raised or lowered, as may be necessary, and thus keep the pinion in line with the bull-wheel H, and prevent the outer edge of the pinion working out of gear; I, the axle on which the wheels run which transport the machine.

I claim as new and as my invention—

Support D, in combination with clasp E, bracket A, and shaft C, substantially as described.

JOHN A. FIELD.

Witnesses:
J. B. SMITH,
C. A. WEED.